United States Patent [19]

Kageyama et al.

[11] 4,116,895

[45] Sep. 26, 1978

[54] PUNCTURE SEALANT COMPOSITION

[75] Inventors: Kunio Kageyama, Yokohama; Mituharu Iwakura, Hiratsuka, both of Japan

[73] Assignee: The Yokohama Rubber Co., Ltd., Tokyo, Japan

[21] Appl. No.: 802,046

[22] Filed: May 31, 1977

[30] Foreign Application Priority Data

Jun. 7, 1976 [JP] Japan ................................. 51-66225
May 10, 1977 [JP] Japan ................................. 52-52586

[51] Int. Cl.$^2$ ............................................. B60C 21/08
[52] U.S. Cl. ........................................ 260/5; 152/347; 252/72; 260/29.7 B; 260/29.7 D; 260/29.7 M; 260/29.7 N; 260/29.7 NR; 260/29.7 UA
[58] Field of Search ................... 260/29.7 B, 29.7 UA, 260/29.7 NR, 5, 29.7 M, 29.7 N, 29.7 D; 152/347; 252/72

[56] References Cited

U.S. PATENT DOCUMENTS

| | | | |
|---|---|---|---|
| 3,243,390 | 3/1966 | Hillard, Jr. et al. | 260/29.7 UA |
| 3,860,539 | 1/1975 | Miyazato | 152/347 |
| 4,032,500 | 6/1977 | Koch et al. | 152/347 |

*Primary Examiner*—Eugene C. Rzucidlo
*Attorney, Agent, or Firm*—Armstrong, Nikaido, Marmelstein & Kubovcik

[57] ABSTRACT

Disclosed are a puncture sealant composition in emulsion for a tubeless pneumatic tire comprising a butyl rubber emulsion, a saturated hydrocarbon polymer emulsion, a crosslinking agent for the rubber and a crosslinking activator. A composition further containing a diene type unsaturated polymer emulsion and/or a natural rubber latex is also disclosed. These compositions are suitable for use in the production of a self-sealing vehicle tire.

18 Claims, No Drawings

PUNCTURE SEALANT COMPOSITION

The present invention relates to a puncture sealant composition in emulsion and, more specifically, it relates to a puncture sealant composition in emulsion suitable for use in a puncture sealing material for a tubeless pneumatic vehicle tire.

It is, in general, recognized that a tubeless tire is relatively safe against going flat when penetrated by nails and the like. This is because, since the nails and the like do not easily come out of the tire, and since air does not escape around the penetrated nails, a sudden drop of the air pressure in the tire does not occur.

However, in fact, when a tubeless tire penetrated by nails and the like runs for a long period of time, especially at a high speed, the nails and the like tend to easily come out of the tire because of the centrifugal force. Once the penetrated nails and the like come out of the tire, an air leakage, that is, puncture, occurs so that the vehicle provided with such tires becomes as dangerous as that provided tube tires. In order to prevent such danger, it is necessary to assure that the air leakage does not occur even when penetrated nails and the like come out of the tire when the vehicle is moving.

For this purpose various methods of coating sealant compositions on the inner surface of the tires so that a puncture is sealed by the sealant as soon as it occurs and various sealant materials have been proposed.

For instance, there have been proposed: a method of coating the inside of the crown of a tire with a blend of coal tar pitch or petroleum pitch having a melting point of not less than 10° C. and polyisobutylene (Japanese Patent Publication No. 31-9489); a method of applying adhesive rubber to the inside of the crown, followed by bonding to the adhesion rubber an air permeable cloth strip, such as looped fabric and the like (Japanese Patent Publication No. 31-17402); a method of forming an anti-puncture layer by densely packing adhesive material which comprises a partially crosslinked blend of polybutene, process oils and the like and butyl rubber into honeycomb structure (Japanese Patent Publication No. 34-1095); a sealant material for tires which comprise a blend of a crushed product of urethan foam, short fibers of polyvinylidene chloride and the like, and methyl cellulose with a rubber latex, alcohols and ethylene glycol (Japanese Patent Publication No. 39-18744): a liquid sealant material for tires which comprises a blend of rubber particles such as the particles of used tires and an emulsion containing, as main components, vinyl acetate and the ester of acrylic acid (Japanese Utility Model Publication No. 47-7442); a sealant for tires which comprises a combination of a liner layer made of foam and an adhesive material (Japanese Laid-Open Patent Application No. 50-21402); a sealant material for tires which comprises a blend of polybutene, a filler and ethylene-propylene rubber (Japanese Patent Publication No. 50-39453); a sealant for tires which comprises a blend of randomly hydrogenated styrene-butadiene copolymer and an aromatic oil and a rosin type resin (Japanese Patent Publication No. 51-5433); a sealant material for tires which comprises a partially crosslinked blend of a large amount of oil having good compatibility and depolymerized natural or synthetic rubber (Japanese Patent Publication No. 52-4801); a method for preparing two liquids, one of which is prepared by dissolving butyl rubber in a solvent and the other of which is prepared by dissolving liquid rubber (liquid butyl rubber), carbon black, polybutene, styrene-butadiene rubber obtained from hydrogenation solution polymerization and a crosslinking agent, and then, mixing them immediately before spraying to thereby cure the rubbers (Japanese Laid-Open Patent Application No. 52-10354).

However, the methods and materials of these proposals are accompanied by the following problems. That is, cold flow or flow at a high temperature occurs, the centrifugal force created in the tire when the vehicle is operated at a high speed tends to cause the sealant composition to move into the central crown portion of the tire, the use of a large amount of solvents cause safety and working environment problems, and the sealing properties of the sealant materials are not sufficient for a practical use.

Accordingly, the objects of the present invention are to obviate these problems of the aforementioned prior puncture sealant compositions and to provide a novel puncture sealant composition in emulsion which is capable of forming a puncture sealant layer on the inner surface of a tire having an excellent sealing property and is also capable of facilitating the application process of the sealant layer of a tire.

In accordance with the present invention, there is provided a puncture sealant composition in emulsion for a tubeless pneumatic tire comprising a butyl rubber emulsion, at least one saturated hydrocarbon polymer emulsion, a crosslinking agent for the rubber and a crosslinking activator.

In accordance with the present invention, there is further provided a puncture sealant composition in emulsion for a tubeless pneumatic tire comprising a butyl rubber emulsion, at least one additional rubber component selected from the group consisting of diene type unsaturated hydrocarbon polymer emulsions and a natural rubber latex, at least one saturated hydrocarbon polymer emulsion, a crosslinking agent for the rubbers and a crosslinking activator.

For brevity's sake, the diene type unsaturated hydrocarbon polymer emulsion is referred to as "diene type rubber emulsion" hereinbelow.

The butyl rubber emulsion employed in the present sealant composition includes any emulsion containing a so-called butyl rubber and, preferably, includes those which are prepared by emulsifying isobutylene-isoprene copolymer or partially halogenated (e.g. chlorinated or brominated) isobutylene-isoprene copolymer with any surface active agent. The total solid content of the butyl rubber emulsion is preferably 60% by weight or more. This is because, when the total solid content of the butyl rubber emulsion is less than 60% by weight, a large amount of heat energy is necessary for vaporizing the water content in the sealant composition after it is applied to the inside surface of the tire.

The types of diene type rubber emulsion employed in the present sealant composition are those which are compatible with said butyl rubber emulsion, and can be cured (or crosslinked) with the crosslinking agents and the crosslinking activators to form a three-dimentional structure. Examples of such diene type rubbers are polyisoprene, polybutadiene (BR), styrene-butadiene copolymer (SBR), acrylonitrile-butadiene copolymer (NBR), ethylene-propylene-diene ter polymer (EPDM) and their derivatives. For instance, a polyisoprene emulsion can be prepared as follows. First, polyisoprene having a high cis-1,4 content and polymerized in the solution in the presence of an organometalic catalyst is dissolved in a suitable solvent such as toluene; then, in the presence of any anion type, cation type or nonion type surface active agent and using a powerful mixing apparatus, such as a Baker Perkins type mixer provided with a steam or hot water jacket, water is gradually added into the polyisoprene solution, thereby emulsifying the polyisoprene in a finely dispersed form, and; finally, the solvent such as toluene is removed by, for example, distillation under reduced pressure. Instead of the polyisoprene, polyisoprene derivatives which are prepared by copolymerizing or graft-polymerizing one or move vinyl monomers, such as, for example, styrene, vinyl acetate, acrylic acid, methacrylic acid or their esters, or acrylonitrile in an amount of not more than 10% by weight based upon the weight of isoprene or polyisoprene, can be emulsified in a similar way to increase the sealant strength or tack (i.e. the ability to adhere to other materials). The other diene type rubbers prepared by solution polymerization, such as, for example, polybutadiene having a high cis content, 1,2-polybutadiene, styrene-butadiene copolymer, styrene-butadiene copolymer derivatives such as, for example, those which are modified with maleic anhydride and the like, and ethylene-propylene-diene ter polymer, can be also emulsified as in the above-mentioned polyisoprene emulsion. On the other hand, the diene type rubber prepared by emulsion polymerization, such as, for example, random type polybutadiene, styrene-butadiene copolymer, styrene-butadiene copolymer derivatives, such as, for example, those which are prepared by the copolymerization of styrene and butadiene with a small amount of vinylpyridine, and acrylonitrile-butadiene copolymer, can be used by increasing the solid content by a suitable conventional concentration technique. Ordinary natural rubber latex can be also used after concentrating its solid content by the use of an appropriate conventional technique. The total solid content of the diene type rubber emulsion and the natural rubber latex is preferably not less than 60% by weight. When the total solid content is less than 60% by weight, a large amount of heat energy is unpreferably needed for vaporizing the water content present in the sealant composition after the composition is applied to the inside surface of the tire.

The diene type rubber emulsion and/or the natural rubber latex can be blended with the butyl rubber emulsion in any blending ratio. However, in view of the sealing property of the sealant after it is applied to the tire as the sealant layer, the amount of the diene type rubber emulsion and the natural rubber latex (i.e. the additional rubber component) is preferably within the range from 5 to 150 parts by weight, more preferably 20 to 100 parts by weight, in terms of the solid content of the emulsion and latex, based upon 100 parts by weight of the solid butyl rubber.

When the blending amount of the additional rubber component is less than 5 parts by weight (solid content) per 100 parts by weight (solid content) of the butyl rubber, satisfactory strength and gelling time for a practical use cannot be obtained, even in the presence of a crosslinking agent, under crosslinking reaction conditions of a relatively low temperature (e.g. approximately 60° C. or less) and a relatively short time period (e.g. within approximately 30 minutes). This is because the number of the unsaturated bonds of the butyl rubber is small. Furthermore, the cold flow and flow at high temperatures cannot be satisfactorily obviated due to the lack of the sufficient three-dimentional bridge structure. By the addition of the natural rubber and the diene type rubber, both having large amounts of the unsaturated bonds, since these additional rubber components are co-crosslinked together with the butyl rubber, the three-dimentional bridge structure of the sealant increases and the properties of the sealant is improved. Contrary to this, when the blending amount of the additional rubber component is more than 150 parts by weight (solid content) per 100 parts by weight of the solid butyl rubber, both the anti-permiability to air and the sealing property of the resultant sealant layer decrease.

The diene type rubber emulsion blended with the butyl rubber emulsion should be the same type as that of the butyl rubber emulsion, depending upon the type of the butyl rubber emulsion used in the present sealing composition, that is, anionic type, cationic type or non-ionic type emulsion. When the natural rubber latex is used, the anionic or nonionic type emulsion of the butyl rubber is preferably employed in the present sealant composition since the pH of the natural rubber latex is generally on the alkaline side. However, the cationic type emulsion of the butyl rubber is sometimes mixed with the natural rubber latex in a stable state without causing gelation.

The saturated hydrocarbon polymer emulsion employed in the present sealant composition suitably includes those which contain a polymer having an average number molecular weight of approximately 500 to approximately 100,000 and which are derived from at least one monoolefin having 4 through 6 carbon atoms. Examples of such polymers are: polybutene obtained from the polymerization of isobutene; polyisobutylene obtained from the polymerization of isobutylene; polypentenes obtained from the polymerization of one or more pentenes; polyhexenes obtained from the polymerization of one or more hexenes, and; polyolefins obtained from the copolymerization of monoolefins having 4 through 6 carbon atoms. These polyolefins are liquid or semi-solid at room temperature and give adhesion properties to the present sealant composition.

The average number molecular weight (Mn) of the saturated hydrocarbon polymer is preferably within the range from approximately 500 to approximately 100,000. When the average number molecular weight is less than approximately 500, since the polymer migrates from the sealant layer to the adjacent contacting material layer after the sealant composition is applied to the tire, the problems of the loss of the desired sealant properties, such as, for example, the decrease of the self-sealing property, the increase of the modulus and the like, unpreferably occur. On the other hand, when the molecular weight is more than approximately 100,000, the rubber elasticity becomes stronger, so that the adhesion property is lost and the sealing property decreases.

The above described polymers can be emulsified by the use of an appropriate surface active agent in a similar manner to the diene type rubber. However, in this case, the molecular weight of the saturated hydrocarbon used in the present sealant composition is not so high that emulsions having a high solid content can be easily prepared even without the use of the solvent. The saturated hydrocarbon polymer emulsions can be used alone or in any combination of two or more emulsions, if necessary. The total solid content of the saturated hydrocarbon polymer emulsion is also preferably 60% or more, as in the butyl rubber emulsion and the additional rubber component. In addition, the pH and the type of emulsion (e.g. anionic, cationic or nonionic type) of the saturated hydrocarbon polymers used in the present sealant composition must conform to those of the butyl rubber emulsion, the diene type rubber emulsion and the natural rubber latex.

The saturated hydrocarbon polymer emulsion can be blended with the butyl rubber emulsion or the butyl rubber emulsion and the additional rubber component (for brevity's sake, they are referred to as a "rubber component" hereinbelow) in any blending ratio. However, in view of the adhesion property and the sealing property of the sealant layer after coating, the amount of the saturated hydrocarbon polymer is preferably within the range from 50 to 500 parts by weight (solid content), more preferably, from 80 to 200 parts by weight (solid content), based upon 100 parts by weight of the solid rubber component.

The blend of the butyl rubber emulsion, at least one member of the diene type rubber emulsions and the natural rubber latex, and at least one saturated hydrocarbon polymer emulsion can be used as the sealant layer of the tire. However, according to the present invention said blend is further partially cured (or crosslinked) to form the three-dimensional bridge structure by the use of crosslinking, such as, for example, the crosslinking of the double-bond present in the rubber component and the crosslinking derived from the removal of the hydrogen present in the α-methylene group.

Any known crosslinking agents for the butyl rubber and the diene type rubber can be suitably used in the present sealant composition. However, the curing of the present sealant composition is preferably carried out under moderate conditions, for example, at a temperature within the range from room temperature to approximately 70° C., in order not to decrease the working properties of the manufacturing step and the quality of the products. For this reason, a so-called quinoid curing or resin curing is preferably utilized in the present invention.

In the quinoid curing system, p-quinone dioxime or p-quinone dioxime dibenzoate is preferably used as a crosslinking agent, and organic or inorganic peroxides are also used as a crosslinking activator together with the crosslinking agent. Examples of suitable organic peroxides are: benzoyl peroxide; lauroyl peroxide; 2,4-dichloro benzoyl peroxide; t-butyl peroxybenzoate; bis(p-monomethoxy benzoyl)peroxide; bis(p-nitrobenzoyl)peroxide; 2,5-dimethyl-2,5-bis(benzoyl peroxy)-hexene; cumene hydroperoxide, and; t-butyl hydroperoxide. Hydrogen peroxide is also used. Examples of the suitable inorganic peroxide are manganese peroxide, lead peroxide and the other metal peroxides which do not react with water.

In the resin curing system, alkylphenol resins are used, as the crosslinking agent, and stannous or stannic chloride is used as the crosslinking activator together with the alkylphenol resin.

The amounts of the crosslinking agent and the crosslinking activator used in the present sealant composition mainly depend upon the amount of the unsaturated bond present in the rubber component of the present sealant composition or the amount of the α-methylene group. Thus, depending upon the degree of unsaturation of the butyl rubber employed, the degree of unsaturation and the amount of α-methylene group of the diene type rubber and the natural rubber employed, and the blending ratio of these rubbers, those skilled in the art can determine the amounts of the crosslinking agent and the crosslinking activator employed, in accordance with the conventional polymerization techniques for crosslinked polymers. In a case where the amount of the crosslinking agent used is too small, problems, such as, for example, lack of the sealing property at a high temperature and flow of the sealant during high speed operations occur, since the crosslinking density is low. On the other hand, in a case where the amount of the crosslinking agent is too large, the crosslinking density of the sealant is so high that the modulus of the sealant increases to such an extent that the function of the sealant cannot be accomplished.

For instance, in the quinoid curing system, the amount of the quinone dioximes employed in the present sealant composition is preferably within the range of from 1 to 15 parts by weight, more preferably from 3 to 10 parts by weight, based upon 100 parts by weight of the solid rubber component. Further, the peroxides are usually used in an amount of from 0.5 to 1.5 equivalent weight to one equivalent weight of the quinone dioximes. Although the stoichiometric amount of the peroxides to one equivalent weight of the quinone dioximes equals 1.0, the amounts of the crosslinking agent and the crosslinking activator are practically determined within said range in view of the dispersibility, and the solubility of the crosslinking agent and the crosslinking activator into the emulsion. In a case where the crosslinking activator is small, an effective curing or crosslinking reaction does not occur, even when an excess amount of the crosslinking agent is used. On the other hand, in a case where the amount of the crosslinking activator is too large, the excess amount of the crosslinking activator (peroxides) unpreferably degrades the molecule of the butyl rubber and causes crosslinking of the other diene rubbers.

In the resin curing system, for instance, the amount of the alkylphenol resin used is preferably within the range of from 1 to 15 parts by weight, more preferably from 3 to 100 parts by weight, based upon 100 parts by weight of the solid rubber component. Further, the ratio of the stannous or stannic chloride to the alkylphenol resin is preferably within the range of from 3:1 to 10:1.

The present sealant composition can further include, if desired, inorganic fillers (pigments) such as, for example, silicic anhydride (silica), silicic acid, clay, talc, mica, calcium carbonate, alumina, titanium white, and carbon black and organic fillers such as, for example, micro crystal of cellulose. The blend of these fillers ensures the increase of the solid content of the emulsion, the prevention of cold flow and flow during and immediately after the coating and the improvement of the heat resistance of the crosslinked sealant layer. Only for the purpose of preventing cold flow, an anti-cold flow agent (thixotropic agent) can be incorporated into the present sealant composition.

The amount of the fillers if employed is preferably 50 parts by weight or less based upon 100 parts by weight (solid content) of the emulsion. When the amount of the fillers is more than 50 parts by weight based upon 100 parts by weight (solid content) of the sealant composition in emulsion, the sealing property of the sealant composition tends to decrease.

The present sealant composition is generally applied to materials to be sealed (i.e. the inside surface of the tire and the like) by a conventional spraying or coating technique. For the purpose of obtaining better use of the present sealant composition, it is preferable that the first blend comprising the butyl rubber emulsion and the crosslinking agent and, if used, the diene type rubber emulsion and/or the natural rubber latex, and the second blend comprising the unsaturated hydrocarbon polymer emulsion and the crosslinking activator, are separately prepared, and that the two blend systems are mixed with each other immediately before the sealant composition is used. This is because, if the crosslinking activator such as peroxides and stannous or stannic chloride, is previously incorporated into the emulsion of the rubber component of the present sealant composition, the double bond and the hydrogen atom of the α-methylene group, both present in the rubber molecules, are interacted with the crosslinking activator to form the crosslinking structure and, therefore, the viscosity of the sealant composition increases with the lapse of time. This results in a decrease of the working properties when the sealant composition is sprayed or coated. Contrary to this, when the crosslinking activator is incorporated into the saturated polymer emulsion, said change of the viscosity with the lapse of time does not occur. If the crosslinking agent, such as p-quinone dioxime and alkylphenol resin, is incorporated into the emulsion of the rubber component, the crosslinking reaction does not occur unless the crosslinking activator is present. Accordingly, it is preferable that the first blend containing the emulsion of the rubber component and the crosslinking agent, and the second blend containing the saturated hydrocarbon polymer emulsion and the crosslinking activator, are separately prepared and, then, the two blends are combined immediately before the sealant composition is used. This does not result in a decrease of the quality of the sealant composition, for example, an increase of the viscosity which decreases the working properties does not occur before spraying and coating and, thus, the sealant layer having outstanding properties can be easily formed. Of course, in the mixing of the two blends, the saturated hydrocarbon polymer emulsion can be previously incorporated into the rubber emulsion without the addition of the crosslinking activator.

As mentioned hereinabove, when the present sealant composition is applied to the material to be sealed, for example, the inside surface of the tire, as the puncture sealing layer, it is preferable to combine the two separately prepared blends immediately before the application. Then, after the combined sealant composition is applied to the predetermined portion by spraying or coating, it is allowed to stand at an ambient temperature or is heated to a temperature of up to 60° through 70° C., to thereby vaporize the water content in the sealant composition and simultaneously cause the curing or crosslinking reaction. Since the sealant layer thus formed has a high elongation property and an outstanding self-sealing property, it exhibits an excellent effect as a puncture sealing material for tubeless pneumatic tires and seals the tires against puncture. The present sealant composition is also suitable for use, as a sealing material in the fields of civil engineering and the like.

The present invention is further illustrated by, but by no means limited to the following examples, in which all parts and percentages are by weight unless otherwise noted.

EXAMPLE 1

In 100 parts of butyl rubber emulsion (Exxon Butyl Latex 100, Trade Name, Exxon Chemical Company, solid content 62%, viscosity 3500 cps at 25° C.) 4 parts of p-quinone dioxime (Actor Q, Trade Name, Kawaguchi Chemical Industry Co., Ltd.) was dispersed. In addition, polyisobutylene (Vistanex LMMH, Trade Name, Exxon Chemical Company) was emulsified in a homogenizer by using a surface active agent (Pluronic L-64, a copolymer of propylene oxide and ethylene oxide, Trade Name, Asahi Denka Kogyo K.K.), and into 100 parts of the resultant emulsion (solid content 80%) 20 parts of silicic anhydride and 4 parts of benzoyl peroxide were added and dispersed therein homogeneously. These two type emulsions were mixed with each other and uniformly applied to the inside surfaces of steel radial tires by using a spray machine provided with a two-liquid mixing type static mixer. Then, the applied sealant composition was dried with hot air (approximately 60° C.) to form sealant layers having a thickness of approximately 2.5 through 3 mm. The compositions and the properties of the sealant are shown in Table 2 below.

The tires treated as described above were fitted in rims and inflated with air at a pressure of 1.9 kg/cm$^2$ for the following tests. Sixty nails were driven into each of the pressurized tires, each of which nails had a diameter of 6 mm and a length of approximately 90 mm. Then, at 10 minutes, 1 hour and 24 hours after the nails were driven into the tires, 20 nails were, respectively, pulled out of each of tires and the pressure of the tires was measured. Five tires were used for each test under the same temperature conditions. The portions into which the nails were driven in were the crown and shoulders of the tires. The results are shown in Table 1 below.

Table 1

| | Air Pressure Drop | | |
| --- | --- | --- | --- |
| | | Temperature | |
| Time | −30° | 25° C | 80° C |
| After 10 minutes | 0 | 0 | 0 |
| After 1 hour | 0 | 0 | 0 |
| After 24 hours | 0 | 0 | 0 |

Other tires with nails driven into them were revolved on a steel drum at a tire speed of 80 km/hr for 2 hours, then, at a speed of 120 km/hr for 30 minutes and, after that, at a speed of 128 km/hr for 30 minutes. Then, the revolving speed of the tires was further increased 8 km/hr every 30 minutes until the nails were forced out of the tires by centrifugal force. All of the nails were forced out at a speed within the range of from 130 km/hr to 160 km/hr. As soon as all of the nails were forced out, the steel drum was stopped and the air pressure of the tire was measured to check the air leakage from the tire. A decrease in the tire air pressure was not observed in any of the five tested tires and the sealant layer on the shoulders of the tires did not flow after the test.

EXAMPLES 2 through 15

Sealant compositions were prepared from the ingredients listed in Table 2 and were applied to tires in the same manner as in Example 1. The tires thus treated were tested in the same manner as described in Example 1. In all cases neither a decrease of the air pressure nor a flow of the sealant were observed.

Table 2

| | Ex. No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Butyl Latex 100 | *1 | 100 | 100 | 100 | 100 | 100 | 100 | 100 | 100 | 100 | 100 | 100 | 100 | 100 | 100 | 100 |
| Polybutene HE 1975 | *2 | 100 | 500 | 300 | | | | | 50 | | | 300 | | | 100 | |
| Polybutene HE 375 | *3 | | | | 100 | 400 | | | | | | 200 | | 300 | | 100 |
| Polypentene Emulsion | *4 | | | | | | 100 | 300 | | | | | 200 | | 200 | |
| Polyisobutylene Emulsion | *5 | | | | | | | 100 | 100 | 200 | 100 | | 50 | 100 | 200 | 50 |
| Carbon Black (SRF) | | | | | | 10 | | | | | 10 | | 10 | | 20 | |
| Carbon Black (FT) | | | | | | | 20 | | | | | | | | | |
| Silicic Anhydride | | | 20 | | | | | 20 | 10 | 5 | | | | | 10 | |
| Silicic Acid | | | | 30 | | | | | | | 10 | | | 20 | | |
| Coloidal Silica | | | | | | | 15 | | | | | | 10 | | | 20 |
| Talc | | | | | | | | | | | 10 | | | | | |
| Clay | | | | | | | | | | | | 10 | | 10 | | 10 |
| Antioxidant | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| p-Quinone Dioxime | | 4 | | 6 | | 6 | 6 | | | 8 | 8 | | | | 6 | |
| p,p'-Dibenzoylquinone Dioxime | | | 6 | | 6 | | | 6 | 7 | | | | | | | |
| Benzoyl Peroxide | | 4 | 4 | | 4 | 4 | 4 | | 3 | 4 | | | | | 4 | |
| tert.-Butyl Hydroperoxide | | | | | 4 | | | 3 | | | 4 | | | | | |
| Alkylphenol Resin | | | | | | | | | | | | 10 | 15 | 10 | | 15 |
| Stannic Chloride | | | | | | | | | | | | 2 | 2 | 2 | | 2 |
| Gelling Time (min) | *6 | 5 | 6 | 4 | 5 | 5 | 5 | 7 | 5 | 6 | 6 | 10 | 12 | 10 | 5 | 12 |
| Tensile Strength (kg/cm$^2$) | *7 | 3.7 | 4.2 | 3.2 | 4.8 | 4.1 | 3.8 | 4.4 | 4.9 | 3.7 | 3.8 | 3.3 | 4.6 | 4.5 | 3.8 | 3.9 |
| Elongation (%) | *7 | 500 | 600 | 560 | 500 | 600 | 500 | 800 | 700 | 750 | 650 | 550 | 500 | 650 | 800 | 650 |
| Total Solid Content (%) | *8 | 71.4 | 74.2 | 72.0 | 67.1 | 73.6 | 73.3 | 77.4 | 74.1 | 75.1 | 74.4 | 74.0 | 74.8 | 80.0 | 76.2 | 75.5 |

(NOTE)
*1 Butyl Latex 100: Trade Name, Exxon Chemical Company, solid content 62%.
*2 Polybutene HE 1975: Trade Name, Nippon Petrochemicals Co., Ltd. This is prepared by emulsifying Polybutene HV-1900 (Trade Name, Nippon Petrochemicals Co., Ltd.) having a solid content of 75%.
*3 Polybutene HE-375: Trade Name, Nippon Petrochemicals Co., Ltd. This is prepared by emulsifying Polybutene HV-300 (Trade Name, Nippon Petrochemicals Co., Ltd.) having a solid content of 75%.
*4 Polypentene Emulsion: This is prepared by adding 5 parts of potassium stearate to 100 parts of Quintone B-170 (Trade Name; polypentene, Nippon Zeon Co., Ltd.) and, then, by adding 26 parts of water gradually at a temperature of approximately 80° C. in a powerful mixing apparatus (e.g. a Baker-Perkins type mixer provided with a steam or hot water jacket). (Solid Content 80%).
*5 Polyisobutylene Emulsion: This emulsion is prepared from 100 parts of polyisobutylene, 5 parts of potassium stearate and 26 parts of water in the same manner as mentioned above. (Solid Content 80%)
*6 Gelling Time: The time when the viscosity of the sealant composition after mixing two liquids becomes 100,000 cps at 25° C. The viscosity is measured by using a Brookfield rotation viscometer.
*7 Tensile Strength and Elongation: These values are measured in a Schopper testing machine by using dumbbell specimens. The test speed is 100 mm/min.
*8 Total Solid Content: The total solid content is determined from the residue after the sealant composition is dried at a temperature of 100° C. for 2 hours.

EXAMPLE 16

Chlorinated butyl rubber emulsion was prepared by dissolving chlorinated butyl rubber (Esso Butyl HT, Trade Name, Exxon Chemical Company) into toluene and by emulsifying the solution in the same mixer as the Vistanex LMMH was emulsified in Example 1. The total solid content of the resultant emulsion was 63%.

100 parts of the chlorinated butyl rubber emulsion and 4 part of p,p'-quinone dioxime perbenzoate were blended, while, in 200 parts of polybutene emulsion HE 1975, 50 parts of polyisobutylene emulsion, 30 parts of silicic acid, 1 part of anti-oxidant and 3.2 parts of benzoyl peroxide were well dispersed. These two liquids were mixed with each other and uniformly applied to the inside surfaces of tubeless tires, by using the spray machine described in Example 1, and the applied sealant composition was dried to form sealant layers having an approximately 2.5 mm thickness.

The tires thus treated were statically and dynamically tested in the same manner as described in Example 1. Similar puncture sealing effects as those described in Example 1 were obtained.

EXAMPLE 17

100 parts of butyl rubber emulsion (Exxon Butyl Latex 100, Trade Name, Exxon Chemical Company, solid content 62%, viscosity 3500 cps at 25° C.) and 50 parts of polyisoprene emulsion (refer to footnote *2 of Table 4 hereinbelow) were mixed and, then, 5 parts of p-quinone dioxime (Actor Q, Trade Name, Kawaguchi Chemical Industry Co., Ltd.) was dispersed in the mixture. In addition, into 100 parts of polybutene emulsion (refer to footnote *11 of Table 4 hereinbelow), 20 parts of carbon black (SRF) and 8.4 parts of benzoyl peroxide were added and dispersed therein homogeneously. These two types of emulsions were mixed with each other and uniformly applied to the inside surface of steel radial tires by using a spray machine provided with a two-liquid mixing type static mixer. Then the applied sealant composition was dried with hot air having a temperature of approximately 60° C. to form sealant layers having an approximately 2.5 through 3 mm thickness. The compositions and the properties of the sealant are shown in Table 4 below.

The tires having the above described sealant layer were fitted in rims and were pressurized with air at a pressure of 1.9 kg/cm$^2$ for the following tests. Sixty nails were driven into each of the pressurized tires, each of which nails had a diameter of 6 mm and a length of approximately 90 mm. Then, at 10 minutes, 1 hour and 24 hours after the nails were driven into the tires, twenty nails were pulled out of each of the tires and the pressure of the tires was measured. Five tires were used for each test under the same temperature conditions. The portions into which the nails were driven in were the crown and shoulders of the tires. The results are shown in Table 3 below.

Table 3

| | Decrease of Air Pressure | | |
|---|---|---|---|
| | Temperature | | |
| Time | −30° C | 25° C | 80° C |
| After 10 minutes | 0 | 0 | 0 |
| After 1 hour | 0 | 0 | 0 |
| After 24 hours | 0 | 0 | 0 |

Other tires having the penetrated sixty nails were rotated on a steel drum at a tire speed of 80 km/hr for 2 hours, then, at a speed of 120 km/hr for 30 minutes and, after that, at a speed of 128 km/hr for 30 minutes. Then, the revolving speed of the tires was further increased 8 km/hr every 30 minutes until the nails were forced out of the tires by centrifugal force. All of the nails were forced out at a speed within the range of from 130 km/hr to 160 km/hr. As soon as all of the nails were forced out, the steel drum was stopped and the air pressure of the tire was immediately measured to check the air leakage from the tire. A decrease in the tire air pressure was not observed in any of the five tested tires and the sealant layer on the shoulders of the tires did not flow after the test.

EXAMPLES 18 through 37

Sealant compositions (liquid A and liquid B) were prepared from the ingredients listed in Table 4 and were applied to the tires in the same manner as described in Example 17. The tires so treated were tested in the same manner as described in Example 17. In all cases, neither a decrease of the air pressure of the tire nor a flow of the sealant were observed.

Table 4

| Liquid A | Example No. | 17 | 18 | 19 | 20 | 21 | 22 | 23 | 24 | 25 | 26 |
|---|---|---|---|---|---|---|---|---|---|---|---|
| Butyl Emulsion | *1 | 100 | 100 | 100 | 100 | 100 | 100 | 100 | 100 | 100 | 100 |
| Polyisoprene Emulsion (I) | *2 | 50 | 50 | | 100 | | | | | | |
| Polyisoprene Emulsion (II) | *3 | | | 30 | | | | | | | |
| Polybutadiene Emulsion | *4 | | | | | | 50 | | | | |
| SBR Emulsion | *5 | | | | | | | 30 | 50 | 80 | |
| NBR Emulsion | *6 | | | | | | | | | 20 | 40 |
| EPDM Emulsion | *7 | | | | | | | | | | |
| Natural Rubber Latex | *8 | | | | | | | | | | |
| Antioxidant | *9 | 1.0 | 1.0 | 1.0 | 1.0 | 1.0 | 1.0 | 1.0 | 1.0 | 1.0 | 1.0 |
| p-Quinone Dioxime | | 5 | | 5 | 4 | 6 | | | 8 | 6 | 3 |
| p,p'-Dibenzoylquinone Dioxime | | | 6 | | | | 5 | 8 | | | |
| Alkylphenol Resin | *10 | | | | | | | | | | |

| | Example No. | 27 | 28 | 29 | 30 | 31 | 32 | 33 | 34 | 35 | 36 | 37 |
|---|---|---|---|---|---|---|---|---|---|---|---|---|
| Butyl Emulsion | *1 | 100 | 100 | 100 | 100 | 100 | 100 | 100 | 100 | 100 | 100 | 100 |
| Polyisoprene Emulsion (I) | *2 | | | | | | | | | 50 | | |
| Polyisoprene Emulsion (II) | *3 | | | | | | | | | | | |
| Polybutadiene Emulsion | *4 | | | | | | | | | | | |
| SBR Emulsion | *5 | | | | | | | | | | | |
| NBR Emulsion | *6 | 60 | | | | | | | | | | |
| EPDM Emulsion | *7 | | 20 | 50 | 100 | | | | 50 | 50 | 60 | |
| Natural Rubber Latex | *8 | | | | | 20 | 40 | 50 | | | | 20 |
| Antioxidant | *9 | 1.0 | 1.0 | 1.0 | 1.0 | 1.0 | 1.0 | 1.0 | 1.0 | 1.0 | 1.0 | 1.0 |
| p-Quinone Dioxime | | | 6 | 6 | 8 | 5 | 6 | 5 | | | | |
| p,p'-Dibenzoylquinone Dioxime | | 10 | | | | | | | | | | |
| Alkylphenol Resin | *10 | | | | | | | | 10 | 15 | 15 | 10 |

| Liquid B | Example No. | 17 | 18 | 19 | 20 | 21 | 22 | 23 | 24 | 25 | 26 |
|---|---|---|---|---|---|---|---|---|---|---|---|
| Polybutene Emulsion (I) | *11 | 100 | 100 | | 100 | 100 | | 100 | | 100 | |
| Polybutene Emulsion (II) | *12 | | 50 | | 100 | 50 | | | | 50 | 30 |
| Polypentene Emulsion | *13 | | | 100 | | | 100 | | 150 | | |
| Polyisobutylene Emulsion | *14 | | | | | | | 50 | | 50 | 100 |
| Carbon Black (SRF) | | 20 | | | | 30 | | | | | 20 |
| Carbon Black (FT) | | | | | | | 20 | | 20 | | |
| Silicic Anhydride | | | | | | | | | | | |
| Silicic Acid | | | | 10 | | | | | 5 | | |
| Coloidal Silica | | | | | | | | 10 | | | |
| Talc | | | | | | | | | | | 10 |
| Clay | | | | | | | | | | | |
| Titanium White | | | | | 20 | 20 | | | | 20 | |
| Micro Crystal of Cellulose | *15 | | | | | | | | | | |
| Benzoyl Peroxide | | 8.4 | | 9 | 6 | | 5 | | 8 | 10 | |
| t-Butyl Perbenzoate | | | 12 | | | | | | | | 8 |
| 2,5-Dimethyl-2,5-Bis(Benzoyl Peroxy)Hexene | | | | | | | 12 | | 15 | | |
| t-Butyl Hydroperoxide | | | | | | | | | | | |
| Stannous Chloride | | | | | | | | | | | |
| Stannic Chloride | | | | | | | | | | | |

| | Example No. | 27 | 28 | 29 | 30 | 31 | 32 | 33 | 34 | 35 | 36 | 37 |
|---|---|---|---|---|---|---|---|---|---|---|---|---|
| Polybutene Emulsion (I) | *11 | 150 | 100 | 100 | 200 | 100 | 100 | 50 | 100 | 100 | 150 | 100 |
| Polybutene Emulsion (II) | *12 | | | | 50 | 100 | | | | | | |
| Polypentene Emulsion | *13 | | | | | | | | | | | |
| Polyisobutylene Emulsion | *14 | 50 | 100 | 100 | | | 50 | 100 | 100 | 100 | 50 | 50 |
| Carbon Black (SRF) | | | 20 | | | | | 20 | | 30 | 20 | |
| Carbon Black (FT) | | 20 | | | 40 | | | | | 20 | | 20 |
| Silicic Anhydride | | | | | | 10 | | | | | | |
| Silicic Acid | | | | | | | | | | | | |
| Coloidal Silica | | | | 10 | | | | | | | | |
| Talc | | | | | 10 | | | | | | | |
| Clay | | 10 | | | | | | 10 | | | 10 | |
| Titanium White | | | | | 20 | | 10 | | 10 | | 10 | 10 |
| Micro Crystal of Cellulose | *15 | | | | | | | | 10 | | | 10 |
| Benzoyl Peroxide | | 8 | 8.6 | | 10 | 9 | | | | | | |
| t-Butyl Perbenzoate | | | | 9 | | | | | 10 | | | |
| 2,5-Dimethyl-2,5-Bis(Benzoyl Peroxy)Hexene | | | | | | | 12 | | | | | |
| t-Butyl Hydroperoxide | | | | | | | | | | 10 | 15 | 10 |
| Stannous Chloride | | | | | | | | | 2 | | | 2 |
| Stannic Chloride | | | | | | | | | | 3 | 3 | |

| | Example No. | 17 | 18 | 19 | 20 | 21 | 22 | 23 | 24 | 25 | 26 |
|---|---|---|---|---|---|---|---|---|---|---|---|
| Total Solid Content (Liquids) A+B) (%) | *16 | 71.0 | 72.7 | 71.4 | 70.2 | 72.5 | 71.1 | 71.3 | 71.0 | 69.1 | 72.1 |
| Gelling Time (min) 25° C | *17 | 5.4 | 7.2 | 5.0 | 5.3 | 8.0 | 6.0 | 8.3 | 5.1 | 4.8 | 7.7 |
| Physical Properties | *18 | | | | | | | | | | |

Table 4-continued

| | | | (parts) | | | | | | | | | |
|---|---|---|---|---|---|---|---|---|---|---|---|---|
| 300% Modulus (kg/cm²) 25° C | | 1.7 | 1.6 | 1.8 | 1.7 | 1.3 | 1.5 | 1.4 | 1.6 | 1.7 | 1.5 | |
| | 80° C | | 0.7 | 0.6 | 0.7 | 0.7 | 0.5 | 0.5 | 0.4 | 0.5 | 0.6 | 0.5 |
| Tensile Strength (kg/cm²) | | | | | | | | | | | | |
| | 25° C | | 4.9 | 4.7 | 5.0 | 4.6 | 4.1 | 4.2 | 4.2 | 4.5 | 4.4 | 4.3 |
| | 80° C | | 1.9 | 1.8 | 2.0 | 1.7 | 1.5 | 1.5 | 1.5 | 1.7 | 1.6 | 1.6 |
| Elongation (%) 25° C | | | 750 | 700 | 810 | 690 | 630 | 630 | 630 | 650 | 650 | 650 |
| | 80° C | | 940 | 900 | 1000 | 880 | 810 | 800 | 800 | 820 | 820 | 790 |

| | | Example No. | 27 | 28 | 29 | 30 | 31 | 32 | 33 | 34 | 35 | 36 | 37 |
|---|---|---|---|---|---|---|---|---|---|---|---|---|---|
| Total Solid Content (Liquids A+B) (%) | | *16 | 72.5 | 73.6 | 72.9 | 72.6 | 72.0 | 73.0 | 73.5 | 74.5 | 72.2 | 72.0 | 73.5 |
| Gelling Time (min) 25° C | | *17 | 6.2 | 5.5 | 8.1 | 5.0 | 5.4 | 6.7 | 7.9 | 12 | 10 | 10 | 12 |
| Physical Properties | | *18 | | | | | | | | | | | |
| 300% Modulus (kg/cm²) 25° C | | | 1.7 | 1.8 | 1.4 | 1.9 | 1.6 | 1.7 | 1.3 | 1.2 | 1.3 | 1.1 | 1.2 |
| | 80° C | | 0.6 | 0.7 | 0.3 | 1.0 | 0.5 | 0.6 | 0.3 | 0.3 | 0.3 | 0.2 | 0.3 |
| Tensile Strength (kg/cm²) | | | | | | | | | | | | | |
| | 25° C | | 4.6 | 4.9 | 3.9 | 5.0 | 4.3 | 4.5 | 3.9 | 3.6 | 3.5 | 3.3 | 3.8 |
| | 80° C | | 1.7 | 1.9 | 1.3 | 2.1 | 1.6 | 1.7 | 1.3 | 1.2 | 1.2 | 1.1 | 1.4 |
| Elongation (%) 25° C | | | 680 | 730 | 600 | 790 | 600 | 610 | 590 | 570 | 570 | 550 | 580 |
| | 80° C | | 880 | 910 | 750 | 980 | 800 | 810 | 780 | 750 | 750 | 700 | 700 |

(NOTE)
*1 Butyl Emulsion: Butyl Latex 100 (Trade Name, Exxon Chemical Company, solid content 62%, Viscosity 3500 cps at 25° C.).
*2 Polyisoprene Emulsion (I): Polyisoprene having a cis content of 98% or more and prepared by solution-polymerization is dissolved in toluene and, then, the solution is emulsified in a Baker-Perkins type mixer provided, with a hot water jacket at a temperature of 60° C., by adding water gradually in the presence of a nonionic surface active agent (Pluronic L-64, a copolymer of propylene oxide and ethylene oxide, Trade Name, Asahi Denka Kogyo K.K.). The resultant emulsion is distilled in vacuo to remove toluene and to concentrate the solid content of the emulsion up to approximately 60%.
*3 Polyisoprene Emulsion (II): To 100 parts of the polyisoprene emulsion (I), 2 parts of methacrylic monomer and 0.05 parts of benzoyl peroxide are added and graft-polymerized.
*4 Polybutadiene Emulsion: Nipol LX111 (Trade Name, Nippon Zeon Co., Ltd., Polybutadiene emulsion) is concentrated to a total solid content of 60%.
*5 Styrene-Butadiene Emulsion: Nipol 4850 (Trade Name, Nippon Zeon Co., Ltd., SBR Emulsion, total solid content 63%).
*6 Acrylonitrile-Butadiene Copolymer Emulsion: Nipol 1562 (Trade Name, Nippon Zeon Co., Ltd., NBR Emulsion) is concentrated to a total solid concentration of 60%.
*7 Ethylene-Propylene-Diene Ter Polymer Emulsion: A copolymer of ethylene-propylene-dicyclopentadiene is dissolved in n-hexane and, then, an emulsion having a solid content of 60% is prepared in the same manner as described in note 2 above.
*8 Natural Rubber Latex: An ordinary natural rubber latex is concentrated to a solid content of 60%.
*9 Antioxidant: Sumilizer BHT (Trade Name, Sumitomo Chemical Co., Ltd.).
*10 Alkylphenol Resin: Amberol ST-137 (Trade Name, Alkylphenol resin manufactured by Rohm & Haas Company).
*11 Polybutene Emulsion (I): Polybutene HE 1975 (Trade Name, Nippon Petrochemicals Co., Ltd., Polybutene emulsion, solid content 75%, $\overline{M}n$ = approximately 1900).
*12 Polybutene Emulsion (II): Polybutene HE 375 (Trade Name, Nippon Petrochemicals Co., Ltd., Polybutene Emulsion, solid content 75%, $\overline{M}n$ = approximately 560).
*13 Polypentene Emulsion: Into 100 parts of Quintone B-170 (Trade Name, Nippon Zeon Co., Ltd., Polypentene, $\overline{M}n$ = approximately 1100), 5 parts of potassium stearate is added and, then, 26 parts of water is gradually added by using a Baker-Perkins type mixer provided with a hot water jacket at a temperature of approximately 80° C. The solid content of the emulsion thus obtained is 80%.
*14 Polyisobutylene Emulsion: Prepared from 100 parts of Polyisobutylene (solution polymerization) having a $\overline{M}n$ of approximately 50,000, 5 parts of potassium stearate and 26 parts of water in the same manner as described in NOTE 13 above.
*15 Micro Crystal of Cellulose: Avicel (Trade Name, Asahi Chemical Industry Co., Ltd.).
*16 Total Solid Content: Determined by the measurement of the weight of the residue after approximately 2.5 g (weighing quantity) of the sample is heated at a temperature of 100° C. for 2 hours.
*17 Gelling Time: Time when the viscosity of a sample after mixing two liquids (i.e. liquids A and B) becomes 100,000 cps at 25° C. The viscosity is measured by using a Brookfield rotation viscometer.
*18 Physical Properties: Measured for dumbbell specimens, which are derived from water-removed sheets formed on a flat glass plate and having a thickness of 0.5 mm, by using a Schopper testing machine. The test speed is 100 mm/min.

EXAMPLES 38 through 43

Esso Butyl HT (Trade Name, Chlorinated Butyl Rubber, Exxon Chemical Company) was swelled and dissolved in toluene to a solid content of approximately 70%. This solution was emulsified in the same manner as described in footnote 14, of Table 4, and the toluene was distilled off in vacuo. The solid content of the chlorinated butyl rubber emulsion thus obtained was 63%. An emulsion of brominated butyl rubber (Polysar Bromobutyl X-2, Trade Name, Polysar Ltd.) having a solid content of 61% was also prepared in the same manner. These emulsions were blended as shown in Table 5.

Table 5

| | (parts) | | | | | |
|---|---|---|---|---|---|---|
| Example No. | 38 | 39 | 40 | 41 | 42 | 43 |
| Liquid A | | | | | | |
| Chlorinated Butyl Rubber Emulsion | 100 | 100 | 100 | | | |
| Brominated Butyl Rubber Emulsion | | | | 100 | 100 | 100 |
| Polyisoprene Emulsion* | 50 | | | 30 | | |
| EPDM Emulsion* | | 50 | | | 30 | |
| NBR Emulsion* | | | 50 | | | 30 |
| Antioxidant* | 1 | 1 | 1 | 1 | 1 | 1 |
| p-Quinone Dioxime | 5 | 5 | 4 | 5 | 4 | 4 |
| Liquid B | | | | | | |
| Polybutene Emulsion (I)* | 100 | 50 | 100 | 100 | 50 | 50 |
| Polybutene Emulsion(II)* | | | 30 | 30 | 30 | 40 |
| Polyisobutyrene Emulsion* | 100 | 100 | 20 | 70 | 50 | 100 |
| Benzoyl Peroxide | 8 | 8 | 6 | 10 | | 6 |
| t-Butyl Perbenzoate | | | | | 13 | |
| Titanium White | | | 10 | 10 | | |
| Carbon Black | 20 | | | | 20 | 10 |
| Clay | | | 10 | 10 | | 10 | refer to the footnote of Table 4

The blended two emulsions (liquid A and liquid B) were separately charged into vessels provided with circulating pumps and were maintained at a temperature of approximately 70° C. These two emulsions were applied to the inside surfaces of radial steel tires by using a static mixer into which said two emulsions were separately charged by the circulating pumps. These two emulsions were mixed in a proper blending ratio and coated on the inside surfaces of the tires by spraying them in an atomized state.

The thickness of the sealant layer thus obtained was approximately 3.0 mm and then the tire thus obtained was dried. The tires thus treated were statically and dynamically tested in the same manner as described in Example 17. The results of the puncture sealing effects were similar to those described in Example 17.

Provided that the crosslinking activator is present in an active state, the sealant composition does not flow along the inside walls of the tire and a sealant layer having an outstandingly smooth surface can be obtained. Different from the conventional technique using an organic solvent such as hexane, the application process of the present sealant composition can be simply and safely carried out and there is no danger of fire or explosion.

EXAMPLES 44 through 49

Various puncture sealant compositions, were prepared from butyl rubber emulsions, diene type rubber emulsions and the other ingredients as shown in Table 6 below.

The sealant composition (Liquid A + Liquid B) was uniformly applied to the inside surface of radial steel tires in the same manner as described in Example 17, and the resultant tires were rotated at a temperature of 100° C. or 120° C. for 10 hours to check the degree of flow of the sealant and the sealing properties of the tires the results are shown in Table 6.

Table 6

| Example No. | | 44 | 45 | 46 | 47 | 48 | 49 |
|---|---|---|---|---|---|---|---|
| Liquid A | | | | | | | |
| Butyl Rubber Emulsion *1 | | 100 | 100 | 100 | 100 | 100 | 100 |
| Natural Rubber Latex *1 | | 50 | 50 | | | | |
| EPDM Emulsion *1 | | | | 50 | 50 | | |
| SBR Emulsion *1 | | | | | | 50 | |
| NBR Emulsion *1 | | | | | | | 50 |
| Antioxidant *1 | | 1.5 | 1.5 | 1.5 | 1.3 | 1.0 | 1.5 |
| p-Quinone Dioxime | | 6 | 6 | 6 | 6 | 6 | 6 |
| Liquid B | | | | | | | |
| Polybutene Emulsion (I) *1 | | 200 | 200 | 150 | 150 | 150 | 150 |
| Polybutene Emulsion (II) *1 | | | 100 | 50 | 50 | 50 | 50 |
| Benzoyl Peroxide | | 10 | 10 | 10 | 10 | 10 | 10 |
| Flow of Sealant (mm) *2 | 100° C | 1.3 | 1.4 | 1.2 | 1.1 | 1.5 | 1.4 |
| | 120° C | 1.6 | 1.7 | 1.4 | 1.3 | 1.9 | 1.7 |
| Sealing Test (%) 6 months | Shoulder | 100 | 100 | 98 | 99 | 98 | 99 |
| *3 | Crown | 100 | 100 | 99 | 100 | 100 | 99 |
| 1 year | Shoulder | 100 | 100 | 98 | 99 | 97 | 98 |
| | Crown | 100 | 100 | 99 | 100 | 100 | 99 |

(NOTE)
*1 Refer to the footnote of Table 4.
*2 Flow is determined by the distance in millimeters which the sealant flowed from the edge of the shoulders of the tire to the central portion.
*3 The sealing test is carried out in a similar manner to that described in Example 17. That is, one hundred nails having a diameter of 2.8 mm are driven into the radial steel tires which are coated the sealant composition on the inside surface. The generation of air bubbles is observed when soapsuds are applied to the holes where the one hundred nails are pulled out six months after they were driven into the tires. Then, the nails are redriven into the same holes and are pulled out six months later, and the same soapsuds observation test is repeated. The results are represented by the percentage of the number of non air-bubbled holes to the total holes.

COMPARATIVE EXAMPLE

Into 20 parts of polyisobutylene (Vistanex LMMH, Trade Name, Exxon Chemical Company) was added 80 parts of Polybutene HV-1900 (Trade Name, Nippon Petrochemicals Co., Ltd.) and 15 parts of silicic anhydride and, then, this mixture was heated to decrease its viscosity. This mixture was, then, hot-sprayed at a temperature of approximately 90° C. onto the inside surface of tires.

The tires were tested in a manner similar to that described in Example 17. In the static test all tires showed good sealing properties. However, in the high speed test (dynamic test), one of five tires was not able to seal the holes against the leakage of air from the tire. In addition, after the high speed rotation of the tires it was observed that sealant was deflected towards the center portion of the crown of the tires due to the centrifugal force and the decrease of the viscocity of the sealant, while the shoulders portions and portions having a thinner sealant layer did not have a sealing property.

What we claim is:

1. A puncture sealant for a tubeless pneumatic tire comprising the reaction product of (a) 100 parts by weight in terms of the solid content of an aqueous butyl rubber emulsion, (b) 50 to 500 parts by weight in terms of the solid content of at least one aqueous saturated hydrocarbon polymer emulsion, said saturated hydrocarbon polymer having an average number molecular weight of from 500 to 100,000 and being derived from at least one monoolefin having 4 to 6 carbon atoms, (c) 1 to 15 parts by weight of a crosslinking agent for the rubber and (d) a crosslinking activator.

2. The puncture sealant as claimed in claim 1, wherein said crosslinking agent is p-quinine dioxime or p-quinone dioxime dibenzoate.

3. The puncture sealant as claimed in claim 2, wherein said crosslinking activator is 0.5 to 1.5 equivalent weight of organic or inorganic peroxides to one equivalent weight of said crosslinking agent.

4. The puncture sealant as claimed in claim 1, wherein said crosslinking agent is alkyl-phenol resins.

5. The puncture sealant as claimed in claim 4, wherein said crosslinking activator is stannous or stannic chloride, the ratio of the stannous or stannic chloride to the alkyl-phenol resin being within the range of from 3:1 to 10:1.

6. The puncture sealant as claimed in claim 1, wherein said sealant is formed by applying the components (a), (b), (c) and (d) to the inside surface of a tire.

7. The puncture sealant as claimed in claim 1, wherein said composition further contains at least one filler.

8. The puncture sealant as claimed in claim 1, further comprising at least one additional rubber component selected from the group consisting of diene type unsaturated hydrocarbon polymer emulsions and a natural rubber latex.

9. The puncture sealant as claimed in claim 8, wherein said saturated hydrocarbon polymer is blended in an amount of from 50 to 500 parts by weight in terms of the solid contents of the emulsion, based upon 100 parts by weight of the rubber components in terms of the solid contents of the emulsion and latex.

10. The puncture sealant as claimed in claim 8, wherein said saturated hydrocarbon polymer is at least one polymer having an average number molecular weight of from approximately 500 to approximately 100,000 and is derived from at least one monoolefin having 4 through 6 carbon atoms.

11. The puncture sealant as claimed in claim 8, wherein said additional rubber component is blended in an amount of from 5 to 150 parts by weight in terms of the solid contact of the emulsion and latex, based upon 100 parts by weight of the butyl rubber in terms of the solid contents of the emulsion.

12. The puncture sealant as claimed in claim 8, wherein said diene type unsaturated polymer is polyisoprene, polybutadiene, styrene-butadiene copolymer, acrylonitrile-butadiene copolymer, ethylene-propylene-diene tar polymer or their derivatives.

13. The puncture sealant as claimed in claim 8, wherein the amount of said crosslinking agent is within the range of from 1 to 15 parts by weight based upon 100 parts by weight of the rubber components in terms of solid content of the emulsion and latex.

14. The puncture sealant as claimed in claim 8, wherein said crosslinking agent is P-quinone dioxime or P-quinone dioxime dibenzoate.

15. The puncture sealant as claimed in claim 14, wherein said crosslinking activator is organic or inorganic peroxides.

16. The puncture sealant as claimed in claim 8, wherein said crosslinking agent is alkylphenol resins.

17. The puncture sealant as claimed in claim 16, wherein said crosslinking activator is stannous chloride or stannic chloride.

18. The puncture sealant as claimed in claim 8, wherein said composition further contains at least one filler.

* * * * *